Nov. 1, 1966   W. M. WHITE   3,282,610

PIPE JOINT AND INSERT THEREFOR

Filed March 9, 1964

INVENTOR.
WILLIAM M. WHITE
BY Herbert E. Kidder
AGENT

3,282,610
PIPE JOINT AND INSERT THEREFOR
William M. White, 23199 Sanderson Ave., San Jacinto, Calif.
Filed Mar. 9, 1964, Ser. No. 350,330
1 Claim. (Cl. 285—18)

This invention relates generally to pipe joints, and more specifically, to a new and improved joint for use in connecting a thin-walled steel pipe to an associated female fitting of the type embodying an O-ring seal of rubber or rubber-like elastomeric material.

The primary object of the invention is to provide a new and improved means for obtaining a tapered nose portion on the end of a thin-walled steel pipe, so as to facilitate insertion of the end of the pipe into a companionate female fitting without damaging the O-ring, and without the necessity of using a swaging machine or other heavy equipment to form the pipe. Thick-walled pipe of concrete or composition is usually beveled on its end to facilitate insertion of that end of the pipe into the female fitting. However, with the thin-walled steel pipe that is now finding extensive use throughout the country, there is not enough wall thickness to permit machining a bevel on the end of the pipe, and heretofore the only other practical solution for tapering the end of the pipe has been to swage it. However, this involves the use of heavy swaging equipment, which is expensive and sometimes difficult to transport to the area where the pipe is being laid. Moreover, the use of such swaging equipment is time-consuming and expensive.

Another object of the invention, therefore, is to provide an inexpensive insert that is quickly and easily inserted into one end of a thin-walled steel pipe to provide a tapered nose for the pipe, which makes it easy to insert the end of the pipe into the fitting and past the O-ring seal without damaging the latter.

A further object of the invention is to provide a tapered nose-piece that is inserted into one end of a thin-walled pipe, and which is adapted to fit snugly within any pipe over a wide range of inside diameter tolerances.

These and other objects and advantages of the present invention will become apparent to those skilled in the art upon consideration of the following detailed description of the preferred embodiment thereof, reference being had to the accompanying drawings, wherein.

Figure 1:
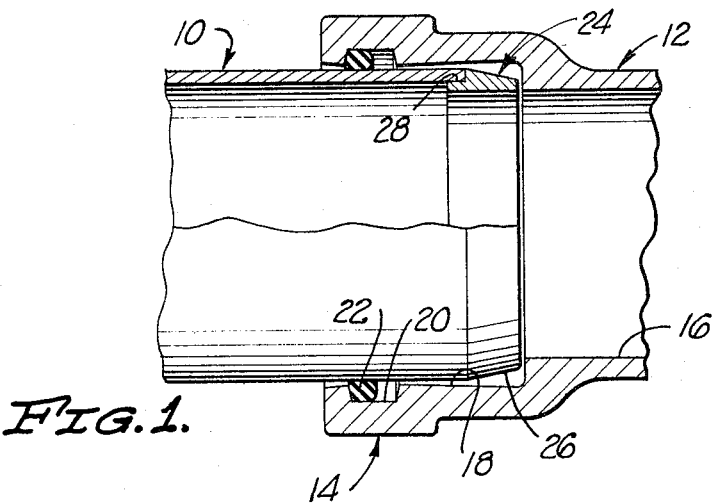
FIGURE 1 is a sectional view through a pipe joint utilizing the insert of the present invention.

In the drawings, the reference numeral 10 designates one end of a length of thin-walled steel pipe of a type commonly used as a water pipe, which is sometimes lined with cement lining (not shown). The pipe 10 may be of any size, ranging from a few inches to several feet in diameter, and with wall thickness ranging from relatively thin gauge steel to quarter inch thickness, or more. A typical wall thickness is 12 gauge, which is approximately .105″ thick.

The reference numeral 12 designates an associated fitting, such as an elbow or the like, preferably of cast iron, having considerably thicker walls than the pipe 10, and being provided with a female, bell end portion 14 which receives the end of the pipe 10. The fitting 12 has an internal bore 16 that is enlarged at 18 to provide the opening into which the end of the pipe 10 is inserted.

Formed around the circumference of the enlarged opening 18 near the outer end of the fitting 12 is an annular groove 20, and seated within this groove is an O-ring seal 22 of rubber or other elastomeric material. The invention is designated in its entirety by the reference numeral 24, and consists of a ring-like insert having a conically tapered outer surface 26 extending back from one edge of the ring for about three-quarters of its width. At its other side edge, the ring 24 has a right-angled recess formed therein around its circumference, providing a reduced-diameter portion 28 and an annular shoulder 30. The inner, circumferential surface 32 of the ring closely approximates the diameter of the bore 16 in the fitting 12, and when the pipe 10 is provided with a cement lining, the inner surface of this lining fairs into the surface 32 of the ring.

The ring 24 is considerably thicker than the pipe wall, being preferably at least twice as thick, and its dimensions are such that the reduced-diameter portion 28 can be inserted into the end of the pipe 10 so that the end of the pipe abuts against the shoulder 30. The ring 24 is split at 34, thereby producing a certain degree of resiliency which permits the ring to be compressed slightly to fit within undersized pipe 10. The ring 24 then expands outwardly to fit snugly against the inside surface of the pipe and thus acommodates itself to a wide range of inside diameter tolerances in the pipes.

Figure 3:
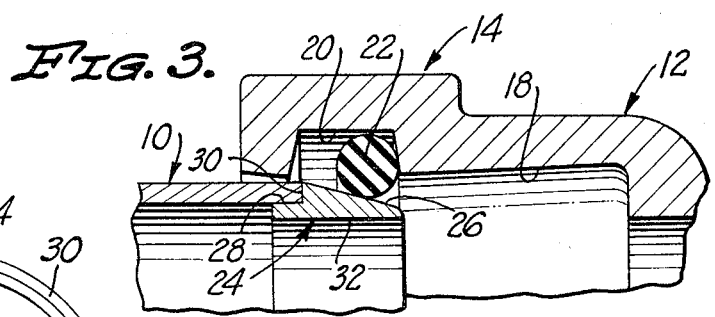
FIGURE 3 is a view similar to FIGURE 2, but showing the end of the steel pipe with the tapered insert ring mounted thereon, in the process of being inserted into the fitting.
Figure 4:
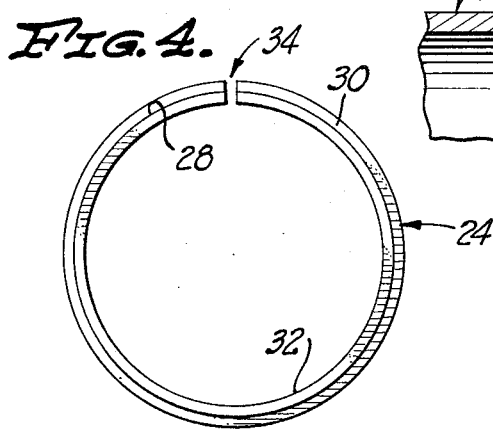
FIGURE 4 is an end view of the annular insert, showing the split which provides the flexibility for accommodating the insert to pipe of slightly different diameters.

When the ring 24 has been installed in the end of the pipe, it is tack-welded to the pipe at several points, and is then ready to be inserted into the fitting 12. The conically tapered surface 26 of the insert 24 fairs smoothly into the outer surface of the pipe 10, thereby forming a smoothly tapered nose piece on the end of the pipe which can be inserted through the O-ring 22 without damaging the latter. As shown in FIGURE 3, as the tapered surface 26 of the ring engages the O-ring seal 22, the latter is stretched slightly as it is raised up onto the outer surface of the pipe 10, and this prevents any pinching or other damage to the O-ring, which frequently occurs when the sharp-edged pipe end is pushed into the fitting 12 without the insert of the present invention.

Figure 2:
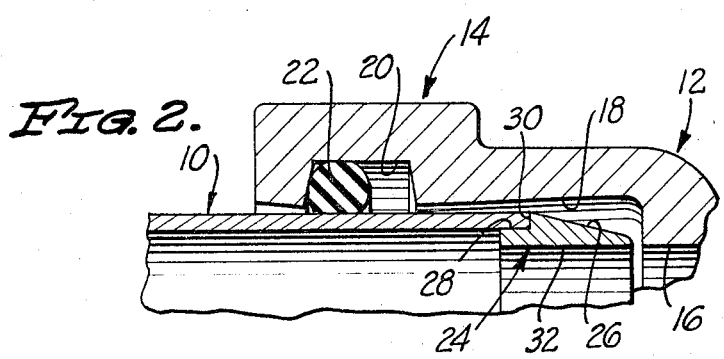
FIGURE 2 is an enlarged fragmentary view of one portion of the joint, showing the steel pipe inserted all the way into the associated fitting, and the O-ring seal in the position that it takes when there is water pressure inside the pipe.

When the end of the pipe 10 has been inserted fully into the end of the fitting 12, the joint is tightly sealed by the O-ring 22. Water pressure within the pipe causes the O-ring 22 to be crowded back to the outer edge of the groove 20, as shown in FIGURE 2, thereby sealing the joint against leakage.

One of the major advantages of the invention is that pipe sections can be cut to length in the field and insert rings 24 placed in the ends thereof, with a minimum of equipment, after which the pipe 10 can quickly and easily be coupled to fittings 12 without damaging the O-ring. This eliminates the need for using expensive and heavy swaging equipment in the field. Another advantage of the invention is that the insert rings can be installed by relatively unskilled workers using nothing more than a simple welding and cutting torch for cutting the pipe to length and installing the insert rings in the ends thereof.

In the foregoing specification, the invention has been described in connection with thin-walled steel pipe and cast iron fittings. The invention is not limited to use with steel pipe, however, but might be used with thin-walled pipe of any other material, such as aluminum, plastic, and the like. The fittings might also be made of any other suitable material. The term "fittings," as used herein, includes elbows, angles, Y-branches, T's, crosses, couplings, valves, and other special shapes.

While I have shown and described in considerable detail what I believe to be the preferred form of my invention, it will be understood by those skilled in the art that various changes may be made in the shape and arrangement of the several parts without departing from the broad scope of the invention as defined in the following claims.

I claim:

A coupling comprising, in combination:

a thin-walled pipe;

an associated fitting having an opening into which one end of said pipe is inserted;

an O-ring sealing the clearance between said pipe and said opening;

an insert ring for use in joining said pipe to said fitting, said ring being of substantially greater thickness than said pipe and being formed with a circumferential groove providing a reduced-diameter portion terminating in an annular shoulder;

said reduced-diameter portion being inserted into the interior of said pipe, with the end of the pipe abutting against said annular shoulder;

said ring having a second portion projecting beyond the end of said pipe, said second portion having a conical outer surface which fairs smoothly into the outer surface of said pipe;

said insert ring forming a tapered nose portion for said pipe to facilitate insertion of said one end of the pipe into said fitting and through said O-ring, said conical outer surface of said insert ring serving to stretch said O-ring and lift the same onto the outer surface of said pipe without damage to the O-ring; and said insert ring being split substantially parallel to its axis and having the ends defining the split spaced apart slightly so as to provide a degree of flexibility permitting the ring to be compressed slightly to fit within the interior of an undersized pipe; said ring being resilient and expanding to engage the interior of the pipe snugly.

References Cited by the Examiner

UNITED STATES PATENTS

| 146,622 | 1/1874 | Valentine | 285—18 |
|---|---|---|---|
| 458,636 | 9/1891 | Meilink | 285—349 |
| 2,052,448 | 8/1936 | Colaert | 29—451 X |
| 2,329,000 | 9/1943 | Rembert | 29—451 |
| 2,355,513 | 8/1944 | Cox. | |
| 2,457,908 | 1/1949 | Meyerhoefer | 285—7 |
| 2,508,716 | 5/1950 | Hauf | 285—5 |
| 2,684,860 | 7/1954 | Rafferty | 285—374 X |
| 2,934,360 | 4/1960 | Castellanos | 285—18 |

FOREIGN PATENTS 1,303,912   8/1962   France.

CARL W. TOMLIN, *Primary Examiner.*